(No Model.) 2 Sheets—Sheet 1.

G. P. FENNER.
DEVICE FOR TRANSMITTING MOTION.

No. 306,601. Patented Oct. 14, 1884.

WITNESSES:
William Miller
J. A. Rutherford

INVENTOR
George P. Fenner
BY
Van Santvoord & Hauff
his ATTORNEYS (No Model.) 2 Sheets—Sheet 2.

G. P. FENNER.

DEVICE FOR TRANSMITTING MOTION.

No. 306,601. Patented Oct. 14, 1884.

WITNESSES:
William Miller
J. A. Rutherford

INVENTOR
George P. Fenner
BY
Van Santvoord & Hauff
his ATTORNEYS

UNITED STATES PATENT OFFICE.

GEORGE P. FENNER, OF NEW LONDON, CONNECTICUT.

DEVICE FOR TRANSMITTING MOTION.

SPECIFICATION forming part of Letters Patent No. 306,601, dated October 14, 1884.

Application filed September 11, 1884. (No model.)

*To all whom it may concern:*

Be it known that I, GEORGE P. FENNER, a citizen of the United States, residing at New London, in the county of New London and State of Connecticut, have invented new and useful Improvements in Devices for Transmitting Motion, of which the following is a specification.

This invention consists in the combination, with a pulley mounted loosely upon a shaft, of a friction-wheel constructed to receive motion from the loose pulley and hereinafter termed the "receiving friction-wheel," a second friction-wheel for reversing the motion and hereinafter termed the "reversing friction-wheel," a third friction-wheel for transmitting the reverse motion and hereinafter termed the "transmitting friction-wheel," a pulley or wheel mounted firmly upon the shaft in position to be acted upon by the transmitting friction-wheel, and a lever for actuating the various friction-wheels, so that when a revolving motion is imparted to the loose pulley and the lever is depressed a revolving motion is imparted to the shaft in a reverse direction to that in which the pulley revolves.

Figure 1:
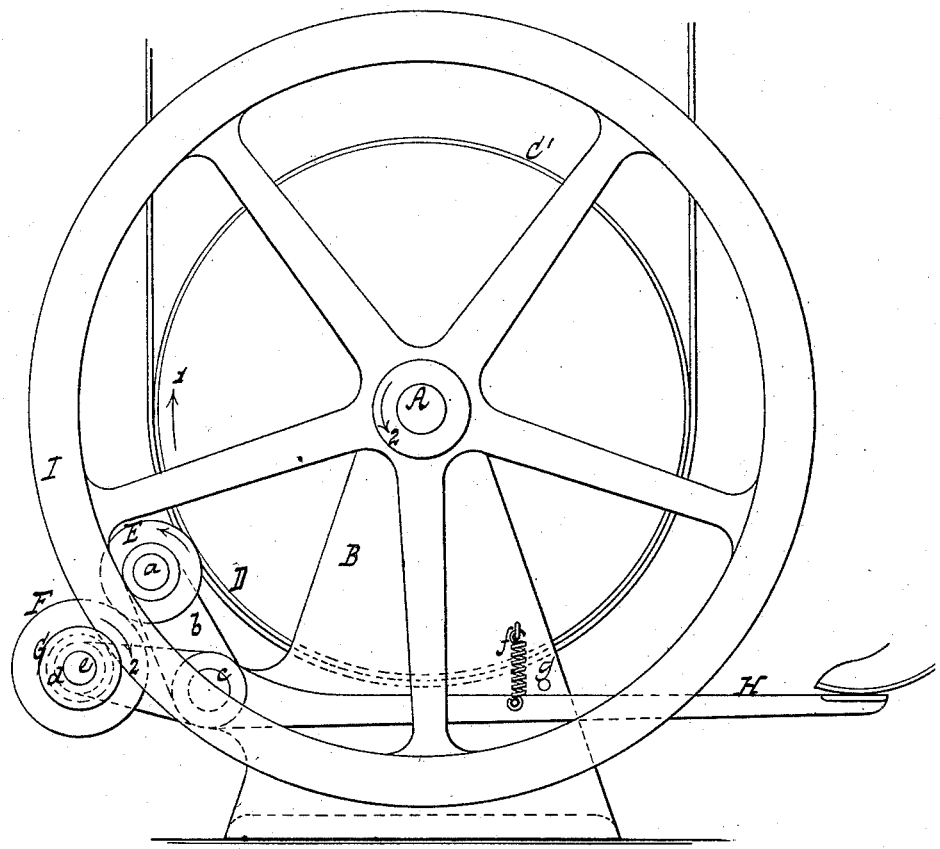
Figure 2:
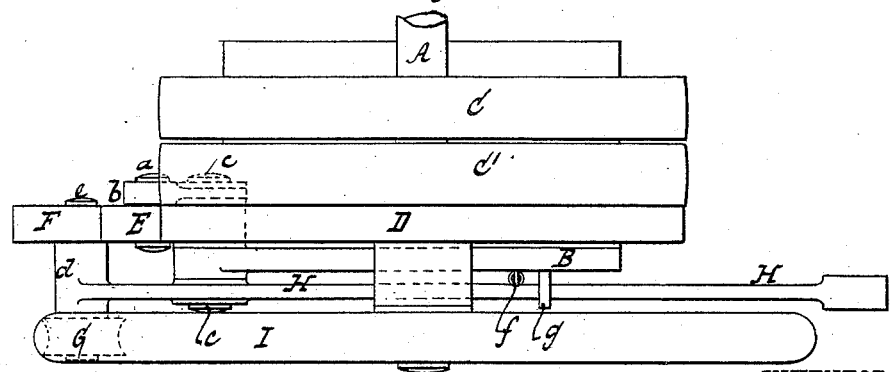
Figure 3:
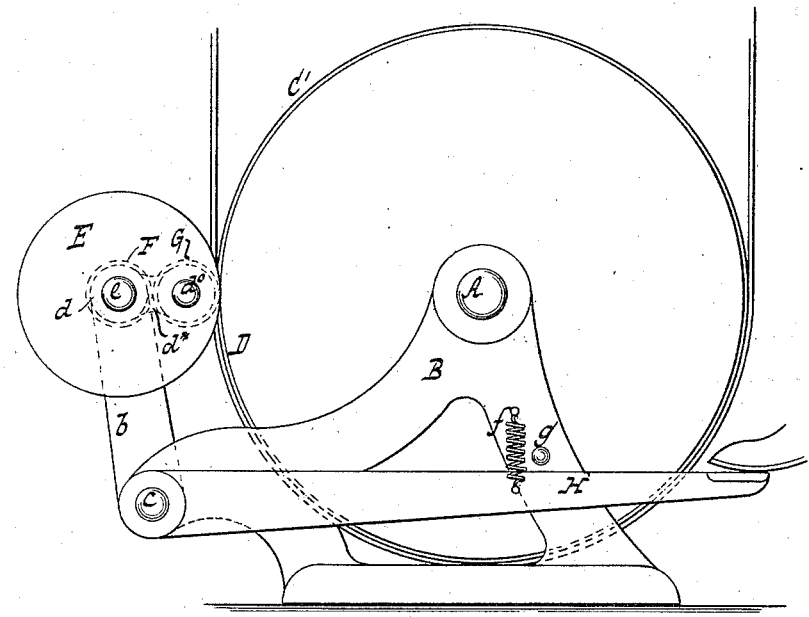
Figure 4:
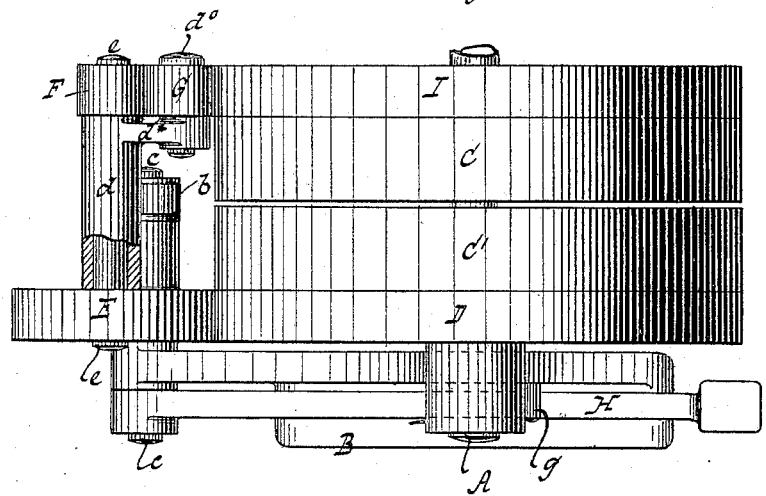

In the accompanying drawings, Figure 1 represents a side view. Fig. 2 is a plan or top view of the same. Fig. 3 is a side view of a modification. Fig. 4 is a plan or top view of the same.

Similar letters indicate corresponding parts.

In the drawings, the letter A designates a shaft, which has its bearings in a suitable frame, B, and to which a revolving motion can be imparted by a belt running on the fast pulley C.

C' is the loose pulley, and if the belt is thrown on this loose pulley the shaft A remains stationary, and the pulley C' revolves in the direction of arrow 1, Fig. 1. To this loose pulley is firmly attached a pulley, D, which may also be a continuation of the rim of the loose pulley, and which is intended to impart motion to the receiving friction-wheel E. This friction-wheel is mounted on a shaft or stud, $a$, which is secured in an arm, $b$, that is firmly mounted on a shaft, $c$, on which is fastened the lever H. This lever extends beyond the shaft $c$, and on its end is formed a hub, $d$, which forms the bearing for a shaft, $e$. On one end of this shaft is mounted the reversing friction-wheel F in such a position that it is in close frictional contact with the receiving friction-wheel E. On the opposite end of the shaft $e$ is mounted the transmitting friction-wheel G in position to act upon the wheel I, which is firmly mounted on the shaft A, and which in this example represents the fly-wheel. The lever H is subjected to the action of a spring, $f$, which has a tendency to throw the same up against a stop, $g$, and when the lever is permitted to follow the action of its spring the receiving friction-wheel E is out of contact with the pulley D, and the transmitting friction-wheel G is out of contact with the wheel I. The loose pulley C' can therefore be turned in the direction of arrow 1; but if the loose pulley is in motion and the lever H is depressed, as shown in Fig. 1, the receiving friction-wheel E is brought in contact with the pulley D, and the transmitting friction-wheel G is forced in contact with the wheel F, so that a revolving motion is imparted to this wheel and to the shaft A, on which the same is firmly mounted in the direction of arrow 2—that is to say, in a reverse direction to that in which the pulley C' is turned by the belt. If the belt is thrown upon the fast pulley C, the shaft A is turned in the direction of arrow 1, and if the belt is then thrown upon the loose pulley C' and the lever H is depressed, the forward motion of the shaft A is first checked by the action of the friction-wheels E, F, and G, and then a reverse motion is imparted to said shaft by the action of the friction-wheel G on the wheel I. In the example shown in Figs. 3 and 4, the wheel I is situated next to the fast pulley C, or it may be made integral with this fast pulley, and the position of the friction-wheels E F G has to be changed accordingly. The lever H is firmly mounted on the shaft $c$, and on the inner end of this shaft is firmly secured the arm $b$, which carries the hub $d$. This hub forms the bearing for the shaft $e$, on one end of which is mounted the receiving friction-wheel E, and on its opposite end is mounted the reversing friction-wheel F. From the hub $d$ extends an arm, $d^*$, to which is secured a stud, $d^\circ$, that carries the transmitting friction-wheel G, the wheels F and G being in close contact. When the lever H is raised in contact with the stop $g$ by the spring, the receiving and transmitting friction-wheels E and G are not in contact with the pulley D and wheel I, respectively; but if the belt is thrown on the loose pulley C' and the lever H is depressed, as shown in Fig. 3, the receiving friction-wheel E is pressed up against the pulley D, and the transmitting friction-wheel G against the wheel I, and a reverse motion is transmitted to the shaft A precisely in the same manner as in the example represented by Figs. 1 and 2.

In the device above described a lever is used for actuating the friction-wheels. It is obvious that in place of the lever a slide might be used, which would be actuated by a cam or screw; but such slide would be simply the mechanical equivalent of the lever.

What I claim as new, and desire to secure by Letters Patent, is—

1. The combination, substantially as hereinbefore described, with a pulley mounted loosely upon a shaft, of the receiving friction-wheel, the reversing friction-wheel, the transmitting friction-wheel, the pulley or wheel mounted firmly upon the shaft in position to be acted upon by the transmitting friction-wheel, and the lever for actuating the friction-wheels.

2. The combination, substantially as hereinbefore described, with the shaft A and the fast and loose pulleys mounted thereon, of the receiving friction-wheel, the reversing friction-wheel, the transmitting friction-wheel, the pulley or wheel mounted firmly upon the shaft in position to be acted upon by the transmitting friction-wheel, and the lever for actuating the friction-wheels.

In testimony whereof I have hereunto set my hand and seal in the presence of two subscribing witnesses.

GEORGE P. FENNER. [L. S.]

Witnesses:
   HIRAM W. HUBBARD,
   GEORGE COLFAX.